(12) United States Patent
Giraud et al.

(10) Patent No.: US 10,870,415 B2
(45) Date of Patent: Dec. 22, 2020

(54) DEVICE FOR CLEANING AN OPTICAL SENSOR OF AN OPTICAL DETECTION SYSTEM FOR A MOTOR VEHICLE

(71) Applicant: Valeo Systèmes d'Essuyage, Le Mesnil Saint Denis (FR)

(72) Inventors: Frédéric Giraud, Le Mesnil Saint Denis (FR); Marcel Trebouet, Le Mesnil Saint Denis (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 100 days.

(21) Appl. No.: 16/336,405

(22) PCT Filed: Aug. 7, 2017

(86) PCT No.: PCT/EP2017/069895
§ 371 (c)(1),
(2) Date: Mar. 25, 2019

(87) PCT Pub. No.: WO2018/059805
PCT Pub. Date: Apr. 5, 2018

(65) Prior Publication Data
US 2019/0217823 A1    Jul. 18, 2019

(30) Foreign Application Priority Data

Sep. 28, 2016 (FR) ...................... 16 59181

(51) Int. Cl.
*G02B 27/00* (2006.01)
*B60S 1/52* (2006.01)
*B60S 1/56* (2006.01)

(52) U.S. Cl.
CPC ................. *B60S 1/528* (2013.01); *B60S 1/56* (2013.01); *G02B 27/0006* (2013.01)

(58) Field of Classification Search
CPC ........... G02B 27/006; B60S 1/528; B60S 1/56
(Continued)

(56) References Cited

U.S. PATENT DOCUMENTS 5,242,114 A * 9/1993 Camier .................. B60S 1/528
239/284.2
5,762,271 A * 6/1998 Lind ....................... B05B 1/304
239/284.2

(Continued)

FOREIGN PATENT DOCUMENTS

DE           10111757 A1    9/2002
DE       102013202036 A1    8/2014
(Continued)

OTHER PUBLICATIONS

International Search Report issued in corresponding International Patent Application No. PCT/EP2017/069895, dated Oct. 16, 2017 (5 pages).

(Continued)

Primary Examiner — Ricky D Shafer
(74) Attorney, Agent, or Firm — Osha Bergman Watanabe & Burton LLP (57) ABSTRACT

The invention relates to a cleaning device (100) for projecting at least one fluid onto a surface to be cleaned of a motor vehicle, such as an optical sensor of an optical detection system, wherein a mobile piston (3) sliding in a hollow body (1) around a fixed rod extending along a longitudinal axis (X) and carrying at one end a cleaning fluid dispensing element (8, 9) enables the fluid to flow to the dispensing element (8, 9), through passage channels (12) arranged between the piston and the rod and having different axial dimensions.

14 Claims, 5 Drawing Sheets

(58) Field of Classification Search
USPC .......................................................... 359/509
See application file for complete search history.

(56) References Cited

U.S. PATENT DOCUMENTS

| | | | | |
|---|---|---|---|---|
| 6,752,329 | B1* | 6/2004 | Price | B60S 1/528 |
| | | | | 239/284.2 |
| 8,113,444 | B2* | 2/2012 | Litvinov | B60S 1/528 |
| | | | | 239/284.2 |
| 8,967,495 | B2* | 3/2015 | Hamza | B05B 11/3001 |
| | | | | 239/284.2 |
| 10,232,774 | B2* | 3/2019 | Trebouet | B60R 11/04 |
| 10,335,806 | B2* | 7/2019 | Lopez | B05B 1/1672 |
| 10,457,253 | B2* | 10/2019 | Trebouet | B60S 1/56 |
| 10,532,368 | B2* | 1/2020 | Lopez | B05B 1/205 |
| 10,569,747 | B2* | 2/2020 | Trebouet | B05B 1/326 |
| 2018/0304862 | A1* | 10/2018 | Picot | B08B 3/02 |
| 2019/0232921 | A1* | 8/2019 | Trebouet | B60S 1/56 |

FOREIGN PATENT DOCUMENTS

| | | | |
|---|---|---|---|
| FR | 2720044 | A1 | 11/1995 |
| FR | 2967116 | A1 | 5/2012 |
| FR | 3021014 | A1 | 11/2015 |

OTHER PUBLICATIONS

Written Opinion issued in corresponding International Patent Application No. PCT/EP2017/069895, dated Oct. 16, 2017 (5 pages).

* cited by examiner

DEVICE FOR CLEANING AN OPTICAL SENSOR OF AN OPTICAL DETECTION SYSTEM FOR A MOTOR VEHICLE

The present invention relates to the field of driver aid devices and optical detection systems used for that purpose, and relates more particularly to the cleaning devices which are intended to spray at least one fluid toward a surface that is to be cleaned belonging to a motor vehicle, such as an optical sensor of an optical detection system for a vehicle.

Any system comprising optical sensors, such as cameras, laser sensors or other sensors based on the emission and/or detection of light in the spectrum visible or invisible to man, particularly in the infrared, is referred to as an optical detection system.

Such optical detection systems are being fitted to an increasing number of motor vehicles in order to aid the driver of the vehicle in certain driving situations, a well-known example of which is to assist with parking. In order for this assistance to be as effective as possible, the data supplied by the optical detection system needs to be of the highest possible quality, and it is therefore indispensable to have use of sensors capable of performing these data acquisitions. In order to achieve this, a cleaning device may be instructed to inject a cleaning fluid onto a sensor of the optical detection system (for example the lens of an imaging camera) just before the detection is performed (for example the image is taken).

These cleaning devices must not impair the operation of the optical sensor, which means to say that they must notably not lie in the field of view of the sensor, and they must also be as compact as possible in order to meet vehicle space constraints. For that purpose, the cleaning devices usually comprise a part capable of moving between a deployed cleaning position, in which the distribution orifices that the mobile part comprises lie in the vicinity of the surface of the sensor that is to be cleaned, and a rest position in which this mobile part is retracted so that it does not impair the optical detection using the sensor concerned.

The mobile part forms a piston housed in an actuator cylinder. It is known practice to use the pressure of the cleaning fluid admitted to the cylinder to drive the movement of the piston toward its cleaning position, the cleaning fluid also being intended to enter an internal duct of the mobile part, at least when this part is in the cleaning position, so that it can be subsequently injected via the distribution orifices.

The cleaning fluid enters an intake chamber formed in the body via an intake orifice made in an end-piece of the cylinder and the fluid present in the chamber pushes against one end of the mobile piston able to move in the body. The piston therefore slides along a rod secured to tongue.

It is known practice to form, at the free end of the fixed rod, secured to the cylinder and along which the piston slides, slots that the cleaning fluid is able to infiltrate from an upstream first end facing toward the intake chamber. As far as a determined relative position of the piston with respect to the rod, sliding takes place sealingly: the position of the piston completely covers the slots formed in the thickness of the rod. The fluid present in the chamber is stopped by a sealing element and cannot access the passageway slots, which means that the fluid is prevented from being conveyed toward the distribution orifices.

Beyond a defined position, the slots are no longer covered by the piston at their upstream first end, and that allows fluid to pass into the slots, between the rod and the piston, toward the inside of the mobile part as far as the distribution orifices.

By way of example, document FR3021014 discloses such a cleaning device in which the fixed rod secured to the cylinder peripherally comprises a plurality of slots each forming a passage for the cleaning liquid. As explained hereinabove, fluid can be ejected only when the mobile part reaches a determined position with respect to the rod and therefore when the distribution orifices arranged at the end of this mobile part reaches a determined position facing the optical sensor. At this stage, the cleaning fluid arrives en masse in the internal duct, as the ends of the slots are simultaneously uncovered.

One disadvantage with this embodiment is that the cleaning fluid exits with a maximum flow rate from the start to the end of the spraying and the absence of any variation in flow rate prevents any optimization of fluid consumption.

It is an object of the present invention to propose a cleaning device, intended to spray at least one fluid toward a surface that is to be cleaned belonging to a motor vehicle, such as an optical sensor of an optical detection system, which, through a particular arrangement and a particular sizing of cleaning fluid passageways, allows the ejection of cleaning fluid by the intake orifices to be sequenced in such a way that the fluid consumption is optimized and that the effectiveness of the cleaning of the optical sensor is improved.

A first subject of the invention is a cleaning device, intended to spray at least one fluid toward a surface that is to be cleaned belonging to a motor vehicle, such as an optical sensor of an optical detection system for a vehicle, comprising:
- a hollow body closed at one end by an inlet flange,
- a mobile piston able to slide along a longitudinal axis in the hollow body and which at a first end bears a cleaning fluid distribution element, the piston being able to move between a retracted extreme position and a deployed extreme position,
- a rod secured to the inlet flange which runs parallel to the longitudinal axis and along which the mobile piston slides,
- means for conveying cleaning fluid through the hollow body, from a fluid intake end-piece as far as the distribution element, comprising at least one intake chamber, the volume of which varies according to the movement of the mobile piston and a distribution duct formed in the mobile piston,
- the piston and/or the rod are configured to provide between them passageways for cleaning fluid.

The cleaning device according to the invention is characterized in that at least two passageways have different axial dimensions along the longitudinal axis.

According to the invention, the "means for conveying" the cleaning fluid combine all of the ducts, intake chambers and/or passageways that allow the cleaning fluid to be conveyed from the inlet or intake zone as far as the distribution element. These conveying means contain at least one distribution duct formed in the mobile piston, which for preference is made up of two portions of different diameters. The enlarged upper part of the distribution duct is defined in such a way as to allow the rod to slide in the mobile piston whereas the lower part of said duct, because of its smaller diameter, allows the fluid to be pressurized so that this fluid can be ejected onto the optical sensor with a view to cleaning same.

According to the invention, the "means for moving" the piston are formed at least in part by the fluid conveying means, particularly by the pressure that said cleaning fluid exerts on said piston.

According to various features of the invention, considered alone or in combination, provision may be made that:
- the passageways be arranged parallel to the longitudinal axis;
- each passageway have an axial dimension that is distinct from that of the adjacent passageways;
- at least two passageways have variable radial dimensions;
- at least one passageway is interrupted along the longitudinal dimension; the passageways may be interrupted and then recommenced, so that the longitudinal passage of fluid between the rod and the piston is interrupted, at the site of these passage-free portions.

What is meant by "axial dimension" is the height of a passageway in the direction of the longitudinal axis of elongation of the mobile piston, whereas what is meant by "radial dimension" is the depth of said passageway, in the thickness of the part of the mobile piston and/or of the rod in which the passageways may be formed.

The passageways may be formed by slots formed in the mobile piston and/or in the rod, and covered by the rod or, respectively, by the piston. The particular arrangements and sizings of the slots that form the passageways make it possible to vary the fluid flow rate by offering larger or smaller flow sections. It will therefore be appreciated that the cleaning fluid will flow predominantly through the passageway that offers the longest axial dimension. Whatever the radial dimensions and geometries of the passageways, it is necessary to maintain enough land between two consecutive passageways that the piston can be optimally guided around the rod.

According to another series of features, provision may be made that:
- the passageway that has the longest axial dimension have the shortest radial dimension; it will then be appreciated that increasing the radial dimension of a passageway makes it possible to increase the flow rate at which the fluid passes; it is particularly advantageous to be able to increase the flow rate of fluid sprayed by the spray element onto the optical sensor when the spray element is correctly deployed;
- the cleaning device comprise at least three passageways;
- the passageways are arranged in series around the longitudinal axis, with a progressive evolution in the axial dimensions of the passageways from the start to the end of the series.

In one preferred embodiment of the cleaning device, the latter comprises a fluid intake end-piece formed as a projection from the inlet flange and off centered with respect to the longitudinal axis on which the hollow body is centered. The fluid intake end-piece opens into the hollow body in an intake chamber delimited at least in part by the inlet flange, a peripheral wall of the hollow body, and by the mobile piston.

The passageways may notably be formed by a slot formed in the mobile piston and covered, completely in the retracted extreme position, and partially in the other relative positions of the piston and of the rod, by the rod. More specifically, the slots may be formed on the internal wall of the piston delimiting the distribution duct, these slots opening onto the intake chamber.

Advantageously, the means for moving the piston comprise, in addition to the fluid conveying means, which are able to pressurize said cleaning fluid, elastic position-return means housed in the hollow body to tend to return said piston to the rest position. For preference, the elastic position-return means are housed in the hollow body to bear against the hollow piston, on the opposite side to the intake chamber. In one embodiment, the elastic position-return means consist of at least one compression spring able to deform under the effect of the pressure of the cleaning fluid so as to encourage the longitudinal movement of the hollow piston. It will thus be appreciated that, in the phase during which fluid is being filled into the device, the hollow piston moves away from the intake chamber and then effects the reverse return journey at the end of the phase of cleaning by ejection of the fluid.

According to one series of features, provision may be made that:
- the hollow piston comprise a substantially cylindrical central part, able to slide inside a hollow guide sleeve formed at the opposite end of the hollow body to the inlet flange, a terminal distribution part extending the central part and to the free end of which the distribution element is able to be fixed, and an intake part extending the central part in the opposite direction to the terminal distribution part and configured to slide inside said hollow body;
- the passageways respectively comprise a slot formed in the piston along the intake part;
- the terminal distribution part of the piston is designed so that the distribution duct formed in the piston can communicate with a distribution passageway of the distribution element;
- the piston comprise, near its upstream end, a ring, against one face of which the elastic return means can bear; for preference, said ring comprises a peripheral groove arranged in its exterior wall and able to accommodate a sealing element, so that the piston fitted with said element can slide sealingly within the hollow body;
- a peripheral groove may be arranged at a free end of the rod, to accept a seal, so that the rod, fitted with said seal, can slide sealingly in the central part of the piston.

According to another feature of the invention and with a view to falling within an overall hydraulic scheme, the device for cleaning a sensor may comprise, in addition to the intake end-piece, the hollow body, the rod and the mobile piston that bears the passageways, a cleaning fluid storage reservoir and elements for controlling the circulation of cleaning fluid between the reservoir and the intake end-piece. Said control elements may consist of a pump and optionally of a solenoid valve and are configured to prevent cleaning fluid from being admitted to the intake end-piece in a rest position, to supply the intake end-piece with cleaning fluid in order to move the distribution element into a cleaning position on the one hand and spray the cleaning fluid on the other hand, and to prevent the cleaning fluid from being admitted to the intake chamber and the distribution passageway and keep the distribution element in the cleaning position.

When incorporated into the hydraulic system, the solenoid valve is an electrically operated three-way valve able to allow or prevent the passage of a pressurized fluid according to three different positions so as to allow circulation from the pump as far as the actuator or prevent any circulation or else allow liquid to return from the actuator to the reservoir.

A second subject of the invention is a motor vehicle equipped with an optical detection assembly, characterized in that it comprises at least one cleaning device as described hereinabove, intended to spray at least one fluid toward a surface that is to be cleaned belonging to the motor vehicle, such as an optical sensor of an optical detection system for a vehicle.

Further features, details and advantages of the invention and of the operation thereof will become more clearly apparent from reading the description given hereinafter by way of indication, in association with the attached figures, in which.

It should first of all be noted that while the figures explain the invention in detail for the implementation thereof, they may of course also serve the better to define the invention as appropriate. It will also be appreciated that the embodiment of the invention illustrated by the figures is given by way of nonlimiting example. Therefore, other configurations of the device according to the invention may be produced, notably by varying the arrangement, distribution and the axial and/or radial sizing of the passageways, which will necessarily have an impact on the cleaning fluid flow rates and associated pressures.

It is also recalled that, in the description which follows, the terms "upstream" and "downstream" refer to the direction in which the cleaning fluid flows in the cleaning device according to the invention. Thus, the term "upstream" refers to that side of the device according to the invention via which this cleaning fluid is admitted into said device, and the term "downstream" refers to that side of the device according to the invention via which the cleaning fluid is distributed to the outside of this device, toward a surface of an optical sensor of an optical detection assembly of a motor vehicle.

Figure 1:
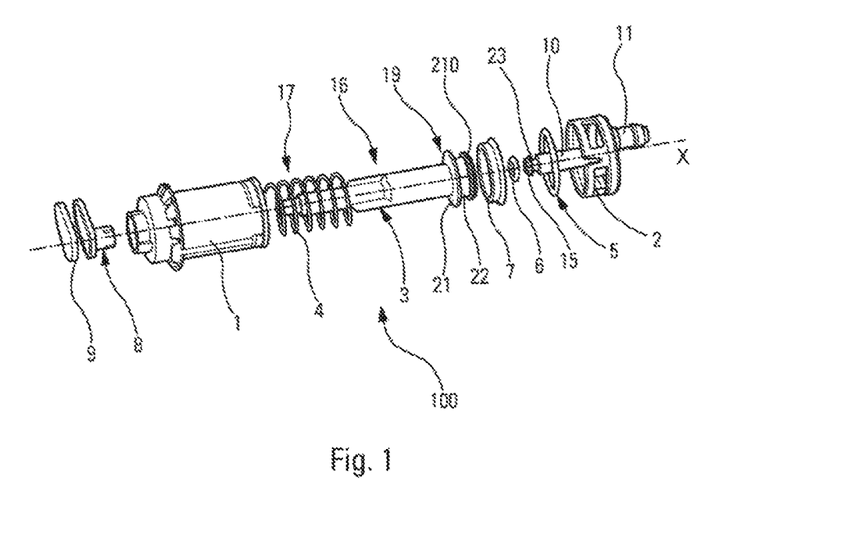
FIG. 1 is an exploded perspective view of a cleaning device according to the invention, intended to spray at least one fluid toward a surface that is to be cleaned belonging to a motor vehicle, such as an optical sensor of an optical detection system, the cleaning device comprising at least one mobile piston able to slide in a hollow body along a fixed rod and bearing a fluid distribution element at one end.
Figure 10:
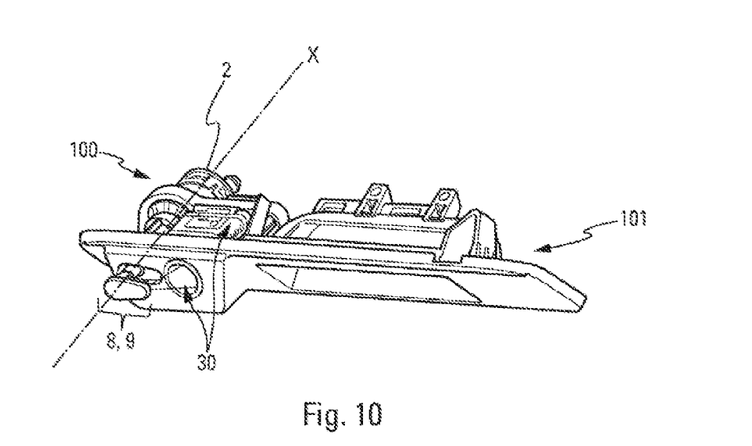
FIG. 10 is an overall view of a support element that supports an optical detection system and an associated cleaning device, such that it can be mounted on a motor vehicle bodywork element.

FIG. 1 illustrates a cleaning device 100 intended according to the invention to spray at least one fluid toward a surface that is to be cleaned belonging to a motor vehicle, such as an optical sensor 30, and FIG. 10 also illustrates a view of a support element 101 configured to accept an optical sensor 30 and a juxtaposed cleaning device 100.

The cleaning device is essentially made up, from upstream to downstream along a longitudinal axis (X) of elongation of the cleaning device, of a fluid intake end-piece 11, of an inlet flange 2, of a rod 10 secured to the inlet flange 2, of a piston 3, of an elastic position-return means 4 and of a distribution element 8, 9. Each of these components is housed inside, or fixed to one end of, a hollow body 1 of revolution about a longitudinal axis (X).

The fluid intake end-piece 11 is formed as a projection from the inlet flange 2 and extends in the opposite direction to the hollow body, being in this instance off centered with respect to the longitudinal axis (X) of the hollow body 1. The intake end-piece 11 has a longitudinal through-bore opening inside the hollow body 1 into an intake chamber 14 (visible notably in FIGS. 4 to 6) delimited at least in part by the inlet flange 2, a peripheral wall of the hollow body 1 and by the mobile piston 3.

The inlet flange 2 is configured to close the upstream end of the hollow body 1. A sealing member 5 may be provided at this closure. The inlet flange is configured to support the rod 10 on its internal face, facing toward the inside of the hollow body.

The rod 10 extends as a projection from the inlet flange 2, inside the hollow body 1. The rod has a cylindrical shape of circular cross section, the exterior peripheral face being smooth. The free end 15 of the rod 10, which extends in the opposite direction to the inlet flange 2, comprises a peripheral groove 23 able to accept an o-ring seal 6 so as to allow the rod 10 to slide sealingly in the piston 3. As will be described hereinafter, the O-ring seal 6 is configured to bear against an internal face of the piston such that the fluid is held back upstream of the O-ring seal between the rod and the piston, as long as the slots formed in the piston do not allow the fluid to escape toward the distribution element.

The piston 3, at a first end, or downstream end, bears a cleaning fluid distribution element 8, 9 made up, in the example illustrated, of two complementary parts in the shape of an L.

The piston 3 comprises, near its upstream end, namely the end facing toward the inlet flange 2, a ring 21 on the exterior wall of which is arranged a peripheral groove 22 able to accommodate a sealing element 7 so as to allow the piston 3 to slide sealingly in the hollow body 1. The sealing element 7 is preferably a lip seal able to limit friction between the piston 3 and the hollow body 1.

The piston is cut from one end to the other by an internal cleaning fluid circulation duct. A more detailed description will be given hereinafter of the internal shape of the piston which, in this instance, is specific notably in that it has a plurality of slots configured to form variable length passageways that allow the passage of liquid at a controlled flow rate.

Figure 6:
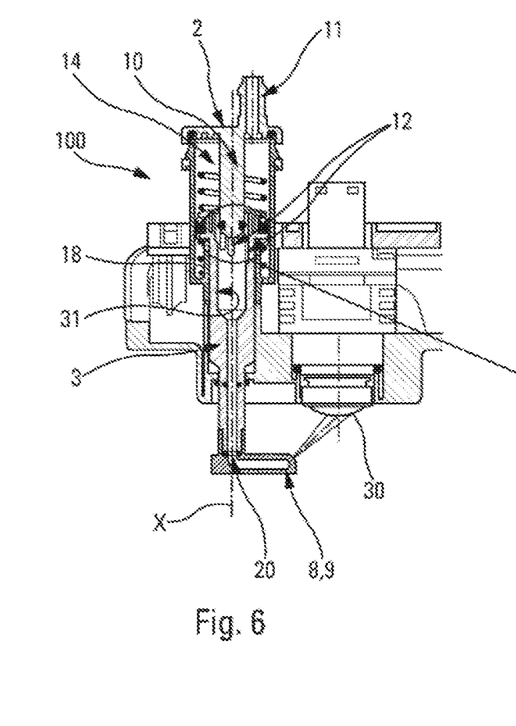
FIG. 6 is a view in cross section, in the same plane of section as that of FIG. 3, of the cleaning device of FIG. 1, when the mobile piston is in the deployed extreme position.
Figure 6A:
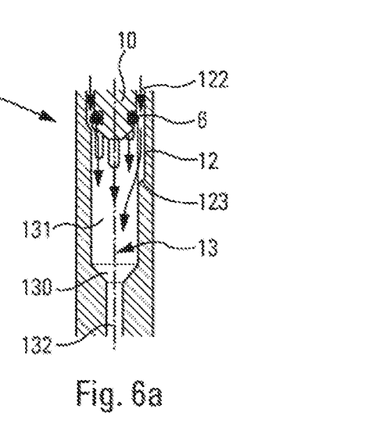
FIG. 6a is a detailed view of the free end of the rod around which the piston slides in this deployed extreme position.

The mobile piston 3 slides in the hollow body 1 between a retracted extreme position, or rest position (visible in FIG. 3), and a deployed extreme position, or cleaning position (visible in FIG. 6).

The cleaning fluid is injected into the hollow body via the intake end-piece so that it can subsequently be ejected via the distribution orifices. Means for conveying the cleaning fluid through the hollow body 1, from the fluid intake end-piece 11 as far as the distribution element 8, 9, comprise at least the intake chamber 14 and a distribution duct 13 (visible in FIGS. 3 to 6) formed in the mobile piston 3.

The elastic return means 4, preferably a coil spring, is arranged in the hollow body between the peripheral wall and the piston, so as to bear at one end against the end wall of the body and at the opposite end on a face of the ring 21.

The piston is mounted in the hollow body around the rod 10 which extends substantially coaxial to the mobile piston 3 so that at least the free end 15 of the rod 10 extends inside the internal distribution duct 13 of the mobile piston 3. The hollow piston 3 comprises substantially cylindrical portions that can be defined, from upstream to downstream, as being an intake part 19 bearing the ring 21, a central part 16 able to slide within a hollow guide sleeve 18 formed at the downstream end of the hollow body 1, and a terminal distribution part 17, of smaller diameter, to the free end of which the distribution element 8, 9 is able to be fixed. The distribution duct 13 formed in the mobile piston is made up of at least two portions of different diameters, of these one being a proximal first part 131 extending from an upstream end of the duct, namely an end opening onto the intake chamber 14, and another being a distal second part 132 extending from the downstream end of the duct. As illustrated in FIGS. 3 to 6, a narrowed zone 130 is arranged between the proximal and distal parts of different diameters.

The enlarged proximal first part 131 of the distribution duct 13 is defined in such a way as to allow relative sliding of the rod 10 with respect to the mobile piston 3, whereas the lower second part of said duct 13, because of its smaller diameter and the resulting region of narrowing, allows the fluid to be pressurized so that it can be ejected onto the optical sensor 30 with a view to cleaning same. The distribution terminal part 17 of the piston 3 is designed to collaborate with the upstream portion 8 of the distribution element so that the lower second part of the distribution duct 13 can communicate with a distribution passageway 20 formed in the distribution element 8, 9.

The piston 3 and/or the rod 10 are configured to provide between them passageways 12 which allow the cleaning fluid to flow from the intake chamber 14 (visible in FIG. 3), the variable volume of which is defined according to the position of the piston 3 relative to the inlet flange 2. The passageways 12 are obtained by slots 120 formed in the exterior wall of the rod, or respectively in the interior wall 31 of the piston, these slots being closed by the piston or, respectively, by the rod. In the embodiment illustrated in FIG. 1, the passageways are each formed by a slot 120 formed in the interior wall of the piston 3 delimiting the internal distribution duct 13 along the intake part 19 and closed by being covered by the smooth exterior peripheral face of the rod 10.

The intake part 19 thus comprises slots 120 whereas the central part 16 of the piston is smooth. The relative sliding of the piston with respect to the rod is thus a sealed sliding, preventing the passage of fluid, when the O-ring seal 6 formed in part by the free end 15 of the rod 10 lies in the central part 16 of the piston and therefore bears continuously against the periphery of the piston, whereas it consists in a permeable sliding, allowing the passage of fluid, when the O-ring seal 6 lies in the intake part 19.

According to one essential feature of the invention, the slots 120 that contribute to forming the passageways 12 have different dimensions from one another, and notably different longitudinal dimensions, so that the progressive arrival of cleaning fluid in the distribution element 8, 9 can be controlled.

Figure 2:
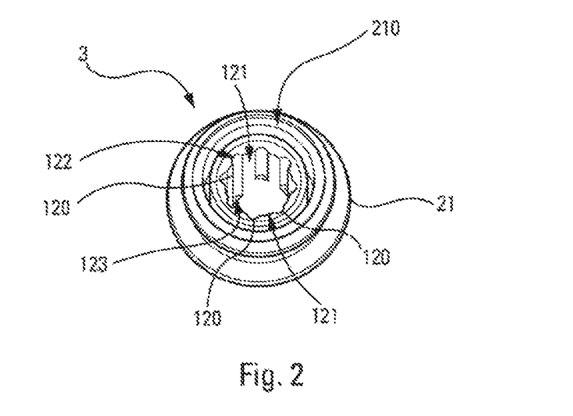
FIG. 2 is a view in cross section of the piston of the device of the invention, in a plane perpendicular to the longitudinal axis (X) of FIG. 1, at an end part at the opposite end from the end bearing the fluid distribution element, illustrating one exemplary embodiment and distribution of passageways formed circumferentially on an interior wall of said piston.

FIG. 2 illustrates one embodiment of the invention and shows one exemplary arrangement, distribution and sizing of the slots 120 that form the passageways 12 formed on the interior wall 31 of the piston 3. Enough land 121 is left between two consecutive slots. What is meant by enough land is that regardless of the configuration and number of the slots, the rod and the piston have enough area of contact with respect to the gaps left by the slots that the piston can be guided stably around the rod. In this example, eight passageways are formed by the combination of one of the eight slots formed in the interior wall 31 of the piston 3 and of the rod bearing against this interior wall. As an alternative which has not been illustrated, provision may be made for the passageways to be formed by slots formed on the exterior peripheral face of the rod and by the interior wall of the piston that covers these slots, it being appreciated that what is important according to the invention is for the slots that contribute to forming the passageways be of different lengths, in the case of at least two of them.

According to the invention, these slots 120 that form the passageways 12 are configured in such a way that one of these slots has an axial dimension, which means to say a dimension along the longitudinal axis (X), that is distinct from the axial dimension of at least one other of the slots. It will be possible to describe hereinafter one possible configuration of the different heights, or axial dimensions, of the slots that contribute to forming the fluid passageways of a cleaning device according to the invention.

These slots 120 extend axially, between a proximal end 122 that opens onto an end face 210 of the ring 21 that contributes to delimiting the intake chamber 14, and a distal end 123, in the thickness of the mobile piston 3 and extending to a determined axial dimension of this proximal end face 210 of the ring 21.

These slots 120 which contribute to forming the passageways 12 may also have variable radial dimensions or depths. Provision may notably be made for the slot that has the longest axial dimension to have the shortest radial dimension, it being appreciated that increasing the radial dimension of a passageway makes it possible to increase the flow rate of fluid passing along this passageway. It is particularly advantageous to be able to increase the flow rate of fluid sprayed by the spray element onto the optical sensor when the spray element is correctly deployed.

One example of a controlled deployment of the distribution element in the cleaning device according to the invention will now be described in greater detail with reference notably to FIGS. 3 to 6 which illustrate successive steps in the deployment.

Figure 3:
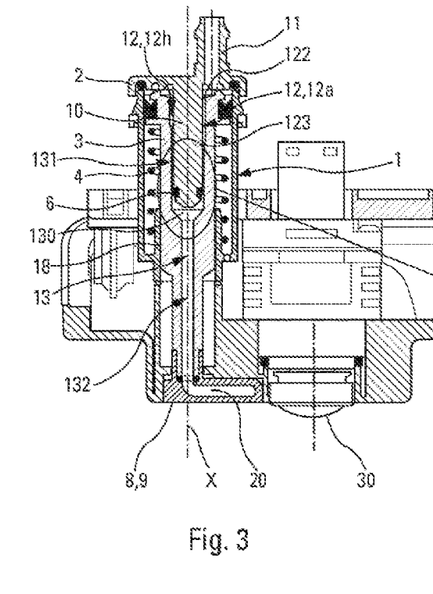
FIG. 3 is a view in cross section, in a plane of section containing the longitudinal axis (X), of the cleaning device of FIG. 1 when the mobile piston is in the retracted extreme position, or rest position.
Figure 3A:
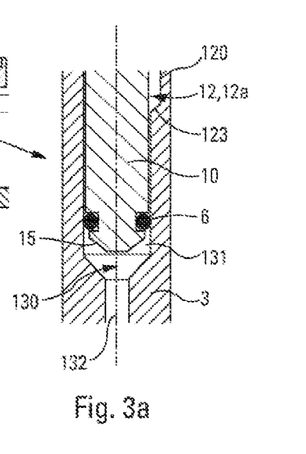
FIG. 3a is a detailed view of the free end of the rod around which the piston slides in this retracted rest position.

FIG. 3 illustrates the cleaning device of the invention in a first, rest, position, in which the distribution element 8, 9 is in the retracted position and housed in the lower part of the body of the cleaning device 100. The piston is therefore arranged in such a way that the intake part 19 is pressed firmly against the inlet flange, the intake chamber 14 then being reduced to a minimum volume. In this rest position, the elastic return means is in the uncompressed state, defining the free length of the spring 4.

It is of note that, in this rest position, the free end of the rod 10 extends deeply into the internal distribution duct 13 formed in the mobile piston so that this free end 15 of the rod lies substantially in the vicinity of the narrowed region 130. In this rest position, the slots 120 arranged in the piston 3 are completely covered by the rod 10 so that, at the distal end 123 of each of these slots, the passageways are closed. The presence of the O-ring seal 6 arranged in the peripheral groove 23 of the rod and dimensioned to rub against the internal wall of the piston, ensures sealing and prevents fluid from passing toward the distribution element.

In this rest position, fluid is injected into the cleaning device when an action to clean an optical sensor is instructed. The fluid spreads between the inlet flange and the mobile piston, into the intake chamber 14, and also infiltrates the passageways, each slot forming a passageway having a free proximal end 123 which opens onto the end face 210 of the ring 21 and which is therefore accessible from the intake chamber. As has just been described, the slots are covered by the piston in this intermediate position and any fluid infiltrating the passageways remains trapped therein.

Figure 4:
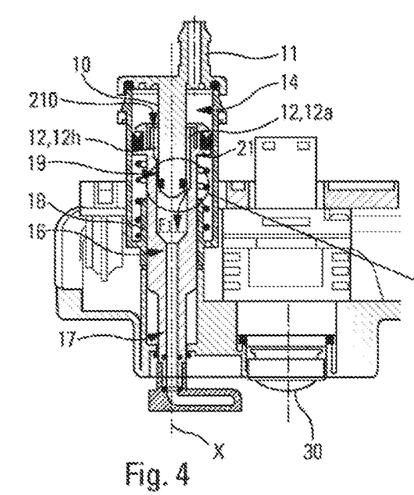
FIG. 4 is a view in cross section, in the same plane of section as that of FIG. 3, of the cleaning device of FIG. 1, in a first intermediate position in which the cleaning fluid is allowed to pass into the mobile piston via a limited quantity of passageways.
Figure 4A:
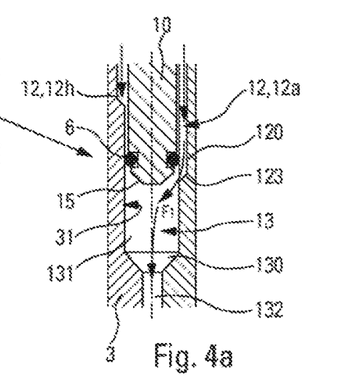
FIG. 4a is a detailed view of the free end of the rod around which the piston slides in this first intermediate position.

FIG. 4 illustrates the cleaning device according to the invention in a first intermediate position between the rest position and the deployed extreme position. This first intermediate position is obtained following the sliding of the piston along the rod, under the effect of the pressure of the cleaning fluid, notably against the ring 21 of the piston 3, cleaning fluid continuing to be injected by the intake end-piece. In this first intermediate position, the piston has slid along the rod so that the free end 15 of the rod 10 is distant from the narrowed region 130; the seal 6 is no longer situated in the central part 16 of the piston but is situated near the intake part 19 in which the slots 120 extend. The rod and the O-ring seal 6 no longer cover the distal end 123 of the slot 120 that has the longest axial dimension, as the O-ring seal lies between this uncovered distal end and the end face 210 of the ring 21. The cleaning fluid present in this slot can therefore infiltrate into the distribution duct 13, as illustrated by the arrow F1 visible in FIG. 4, and fluid can circulate from the intake chamber 14 toward the distribution element 8, 9 via only that passageway the distal end of which is not covered. This results in a passage of fluid at a reduced fluid flow rate, substantially equal to 1/n, n being the number of passageways arranged between the rod and the piston, in this instance equal to eight.

Figure 5:
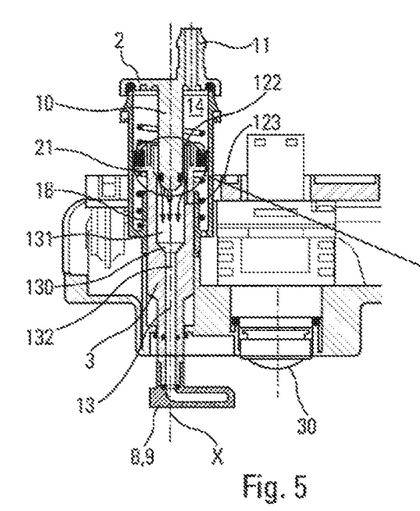
FIG. 5 is a view in cross section, in the same plane of section as that of FIG. 3, of the cleaning device of FIG. 1, in a second intermediate position in which the cleaning fluid is allowed to pass into the mobile piston via a significant quantity of passageways.
Figure 5A:
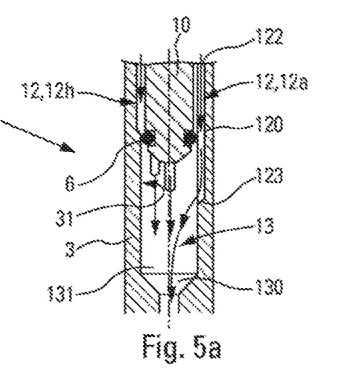
FIG. 5a is a detailed view of the free end of the rod around which the piston slides in this second intermediate position.

FIG. 5 illustrates a second intermediate position between the rest extreme position and the deployed extreme position, in which position the cleaning fluid is allowed to pass into the mobile piston via passageways of which a significant proportion, in this instance five out of eight, are uncovered at their distal end. In this second intermediate position, the piston has slid further along the rod so that the free end 15 of the rod 10 is closer to the upstream end of the duct, which means to say the end opening onto the intake chamber 14. The seal 6 lies in the intake part 19 into which the slots 120 extend, with the rod and the O-ring seal 6 no longer covering the distal end of five of the slots 120, namely the distal end of the five slots that have the longest axial dimension. The fluid can circulate from the intake chamber 14 toward the distribution element 8, 9 via the five corresponding passageways, and this results in a passage of fluid at an intermediate flow rate, substantially equal to 5/n, n being the number of passageways arranged between the rod and the piston, in this instance being equal to eight.

FIG. 6 illustrates the deployed extreme position, namely the position of maximum deployment of the cleaning device and of total ejection of the fluid thanks to the increase in flow rate to 100% by the passage of fluid along each of the passageways 12. The opposing pressure exerted by the spring 4 and/or by the ring 21 of the piston coming into abutment against the hollow guide sleeve 18 makes it possible to limit the movement of the rod with respect to the piston and prevent the rod from escaping from the distribution duct 13 formed in the piston 3. In this position of abutment, the distal end of each of the passageways is uncovered and the seal 6 has the only effect of preventing fluid from passing between the two internal and external walls of the piston and of the rod, without impeding passage along the slots. The distribution element 8, 9 is therefore fully deployed out of the cleaning device so as to adopt an optimum position for cleaning the optical sensor 30, and the flow rate at which the fluid is ejected is therefore at a maximum.

Because of the different axial sizes of the slots, the ejection flow rate can thus be controlled according to the deployment of the distribution element and of the resulting position of the jet of fluid on the optical sensor.

At the end of this phase of cleaning by ejecting the entirety of the fluid, the piston, having moved in the opposite direction to the intake chamber, performs a reverse return journey under the combined effect of the return of the spring and of the cutting-off of the supply of fluid via the intake end-piece, the spring then pushing the piston back to its original position, driving any remaining fluid back out of the intake chamber and out of the hollow body. It should be noted that the axial offset between the distal ends of the slots makes it possible to avoid there being an excessively abrupt overpressure as the piston returns in the hollow body.

Figure 7:
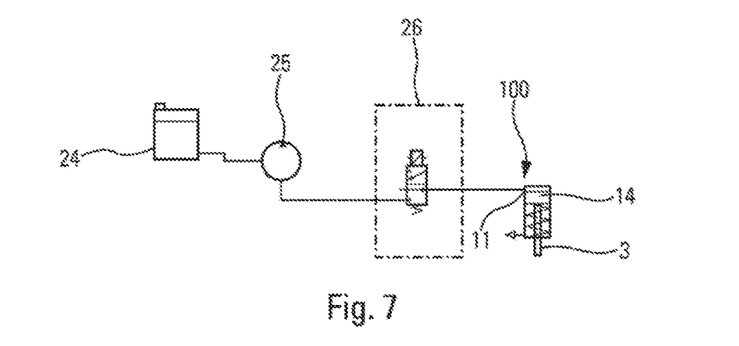
FIG. 7 is a schematic indication of the hydraulic architecture associated with the cleaning device according to the invention.

FIG. 7 schematically illustrates the overall hydraulic architecture associated with the cleaning device 100 and which may comprise, aside from the intake end-piece 11, the hollow body 1, the rod 10 and the mobile piston 3 that bears the passageways with different axial dimensions, a reservoir 24 for storing the cleaning fluid and elements for controlling the circulation of cleaning fluid between the reservoir 24 and the intake end-piece 11 of said cleaning device 100 which, in this instance, is schematically indicated as an actuator. Said control elements may be made up of a pump 25 and optionally of a solenoid valve 26.

It will be appreciated that, at the end of the phase of cleaning by ejection of all of the fluid, the fluid, under the effect of the return of the piston driven by the spring into the rest position, passes through the intake end-piece then returns to the pump and to the storage reservoir.

Figure 8:
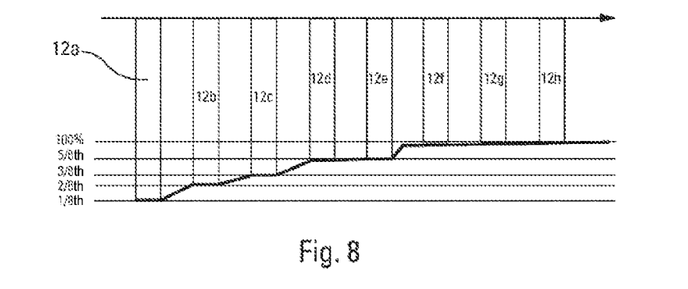
FIG. 8 shows a first example of how the flow rate of a cleaning fluid evolves as the mobile piston moves between a retracted extreme rest position and a deployed extreme position.

FIG. 8 illustrates how the flow rate of cleaning fluid sprayed onto an optical sensor varies as the mobile piston gradually moves between a retracted rest position and a deployed extreme position. It may be noted that, unlike that which would have been the case with a device of the prior art, in which the variation in flow rate would have adopted the appearance of an on/off square wave, with a flow rate at 0% prior to obtaining a single intermediate position in which the piston no longer covers the end of the slots and a flow rate at 100% after this single intermediate position has been passed, here there is an evolution which changes by levels, permitted as a result of the variation in axial dimension from one passageway to another.

In this example, it should be noted that:
- a first passageway 12a has an axial dimension that is longer than that of the others;
- a second passageway 12b, not necessarily positioned directly adjacent to the first passageway in the arrangement whereby the passageways are arranged in a circular series, has an axial dimension that is smaller than that of the first passageway but greater than that of the other passageways;
- a third passageway 12c, which is not necessarily directly adjacent to the second passageway in the arrangement whereby the passageways are in a circular series, has an axial dimension smaller than that of the second passageway but greater than that of the passageways other than the first and the second;
- a fourth passageway 12d and a fifth passageway 12e, which are not necessarily directly adjacent in the arrangement whereby the passageways are in a circular series, have axial dimensions that are equal, and that are less than that of the first three passageways; and
- a sixth passageway 12f, a seventh passageway 12g and an eighth passageway 12h, which are not necessarily directly adjacent in the arrangement whereby the passageways are in a circular series, have axial dimensions that are equal to one another and smaller than that of all the other passageways.

In this example, it will be appreciated that, when the mobile piston is in the rest position, and until such point as it reaches the first intermediate position, no passageway is uncovered and the liquid is trapped, which means that the flow rate at which fluid passes toward the distribution element 8, 9 is zero. In the first intermediate position, only the first passageway, namely the passageway that has the longest axial dimension, has its end uncovered by the relative position of the piston with respect to the rod, and the cleaning fluid present in this first passageway 12a can circulate toward the distribution element via the internal duct 13 in the piston: in one exemplary embodiment in which the eight passageways each have the same depth, which means to say the same radial dimension, the flow rate of cleaning fluid passing toward the distribution element is substantially equal to $1/8^{th}$. It will be appreciated that as the piston gradually advances along the rod, the passageways are successively uncovered from the tallest, which means to say the one having the longest axial dimension, to the shortest, the flow rate at which cleaning fluid passes increasing. In the second intermediate position illustrated in FIG. 5, and in which, by way of example, the first five passageways are uncovered in the order of their axial magnitude, it will be appreciated that the cleaning fluid flow rate is substantially equal to $5/8^{th}$. Thus, it may be seen that the flow rate at which cleaning fluid passes toward the distribution element evolves by levels with, in the example illustrated in FIG. 8, a first level at 12.5%, a second level at 25%, a third level at 37.5%, a fourth level at 62.5% and a final level at 100%. The progressive evolution through the first levels allows a phase of filling and priming at a reduced flow rate, whereas the evolution becomes more rapid toward the end of the piston movement when the cleaning device is in an optimum position for cleaning the optical sensor.

Figure 9:
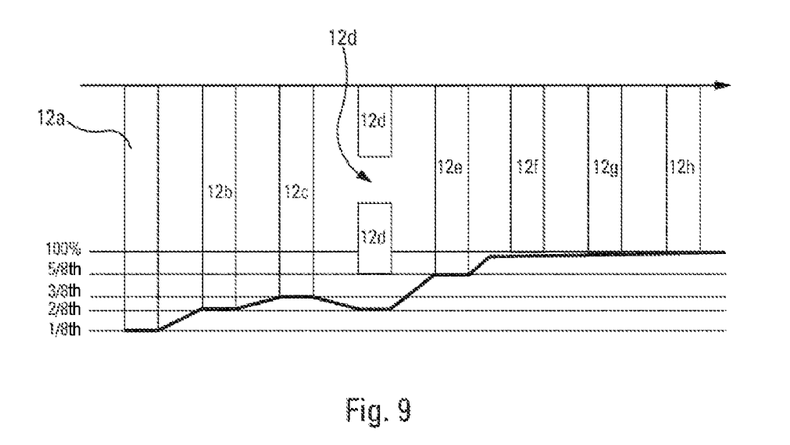
FIG. 9 shows a second example of how the flow rate of a cleaning fluid evolves as the mobile piston moves between a retracted extreme rest position and a deployed extreme position in the particular case in which one of the passageways is interrupted.

FIG. 9 illustrates another exemplary embodiment in which one of the passageways has an interruption more or less at its middle. As will be described hereinafter, this arrangement makes it possible to alter the quantity of fluid sprayed, relative to the deployment of the mobile piston and therefore of the cleaning device. It may be noted that the evolution between the flow rate at 0% and the flow rate at 100% is, on the whole, as shown in the first exemplary embodiment in FIG. 8, progressive in levels, but with a break in the middle of this progression before it resumes.

In this exemplary embodiment, it should be noted that the first three passageways 12a to 12c are similar to those described hereinabove, as are the last four passageways 12e to 12h. By contrast, the fourth passageway 12d differs in that the slot is interrupted to form a neutral zone 120d in which the wall of the rod and/or of the piston is not machined.

It may thus be observed, in the example illustrated in FIG. 9, that there is a level-wise evolution in the flow rate of cleaning fluid passing toward the distribution element with, initially, a progressive evolution, with a first level at 12.5%, a second level at 25% and a third level at 37.5%, then a degressive evolution with a return to the second level at 25%, so as to limit the spraying of fluid in this initial part of the movement of the mobile piston, and finally a further progressive evolution, with a jump to a fourth level at 62% and then a final level at 100%. In this last phase of the evolution, the increase is sharper, the jump from the second level to the fourth level being more pronounced. This then, because of this break in the passageway, provides a jet of pressurized fluid which, once the mobile piston is in a sufficiently deployed intermediate position, allows more effective cleaning.

The foregoing description clearly explains how the invention makes it possible to achieve the objectives it set itself and notably how the invention offers a device for cleaning an optical sensor of a motor vehicle which, through a special layout, a special distribution and a special sizing of the cleaning fluid passageways, makes it possible to sequence the filling with fluid by controlling the flow rate of said fluid and the associated pressure and therefore optimize the fluid consumption and improve the efficiency of the cleaning of the optical sensor. The present invention is not restricted to the embodiments given by way of nonlimiting examples.

The invention claimed is:

1. A cleaning device to spray at least one fluid toward a surface that is to be cleaned comprising an optical sensor of an optical detection system of a motor vehicle, the cleaning device comprising at least:
   - a hollow body closed at one end by an inlet flange;
   - a mobile piston that slides along a longitudinal axis in the hollow body and which at a first end bears a cleaning fluid distribution element, the piston being able to move between a retracted extreme position and a deployed extreme position;
   - a rod secured to the inlet flange which runs parallel to the longitudinal axis and along which the mobile piston slides;
   - means for conveying cleaning fluid through the hollow body, from a fluid intake end-piece as far as the distribution element, the means for conveying comprising at least one intake chamber, the volume of which varies according to the movement of the mobile piston and a distribution duct formed in the mobile piston,
   - the piston or the rod being configured to provide between them a plurality of passageways for the cleaning fluid, wherein at least two passageways of the plurality of passageways have different axial dimensions along the longitudinal axis.

2. The cleaning device as claimed in claim 1, wherein the passageways are arranged parallel to the longitudinal axis.

3. The cleaning device as claimed in claim 1, wherein each passageway has an axial dimension that is distinct from that of the adjacent passageways.

4. The cleaning device as claimed in claim 1, wherein at least two passageways have variable radial dimensions.

5. The cleaning device as claimed in claim 4, wherein the passageway that has the longest axial dimension has the shortest radial dimension.

6. The cleaning device as claimed in claim 1, wherein at least one passageway is interrupted along the longitudinal axis.

7. The cleaning device as claimed in claim 1, wherein the passageways are arranged in series around the longitudinal axis, with a progressive evolution in the axial dimensions of the passageways from the start to the end of the series.

8. The cleaning device as claimed in claim 1, wherein the passageways respectively comprise a slot formed in the mobile piston or in the rod.

9. The cleaning device as claimed in claim 8, wherein the slots are formed on the internal wall of the piston delimiting the distribution duct, these slots opening onto the intake chamber.

10. The cleaning device as claimed in claim 1, wherein the means for moving the piston comprise, in addition to the fluid conveying means, elastic means housed in the hollow body to tend to return the mobile piston to the extreme rest position.

11. The cleaning device as claimed in claim 1, wherein the hollow piston comprises a substantially cylindrical central part, able to slide inside a hollow guide sleeve formed at the opposite end of the hollow body to the inlet flange, a terminal distribution part extending the central part and to the free end of which the distribution element is able to be fixed, and an intake part extending the central part in the opposite direction to the terminal distribution part and configured to slide inside the hollow body.

12. The cleaning device as claimed in claim 11, wherein the passageways respectively comprise a slot formed in the piston along the intake part.

13. The cleaning device as claimed in claim 1, wherein a peripheral groove is arranged at a free end of the rod to accommodate a seal such that the rod, fitted with said seal, slides sealingly in the central part of the piston.

14. A motor vehicle equipped with an optical detection system and with an associated optical sensor, comprising at least one cleaning device as claimed in claim 1, intended to spray at least one fluid toward a surface of the optical sensor that is to be cleaned.

* * * * *